US011617381B2

(12) United States Patent
Karava et al.

(10) Patent No.: US 11,617,381 B2
(45) Date of Patent: Apr. 4, 2023

(54) SYSTEMS AND METHODS FOR BOTTLING STILL FLAVORED WATER

(71) Applicant: The Coca-Cola Company, Atlanta, GA (US)

(72) Inventors: Nilesh Bansilal Karava, Marietta, GA (US); Kevin LaFrance, Canonsburg, PA (US); Juliana Fritts, Atlanta, GA (US); Mark Andrew LeGrett, Woodstock, GA (US); Michael Etters, Howard, PA (US); Jay S. Hamme, Senoia, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 227 days.

(21) Appl. No.: 16/912,753

(22) Filed: Jun. 26, 2020

(65) Prior Publication Data

US 2021/0400999 A1  Dec. 30, 2021

(51) Int. Cl.
| | |
|---|---|
| *A23L 2/56* | (2006.01) |
| *C02F 1/00* | (2023.01) |
| *B67C 7/00* | (2006.01) |
| *B67C 3/02* | (2006.01) |
| *C02F 9/00* | (2023.01) |
| *C02F 1/04* | (2023.01) |
| *C02F 1/44* | (2023.01) |
| *C02F 1/32* | (2023.01) |
| *C02F 1/68* | (2023.01) |
| *C02F 1/66* | (2023.01) |

(52) U.S. Cl.
CPC ............... *A23L 2/56* (2013.01); *B67C 3/026* (2013.01); *B67C 7/00* (2013.01); *C02F 9/00* (2013.01); *A23V 2002/00* (2013.01); *C02F 1/001* (2013.01); *C02F 1/04* (2013.01); *C02F 1/325* (2013.01); *C02F 1/441* (2013.01); *C02F 1/66* (2013.01); *C02F 1/685* (2013.01); *C02F 2301/046* (2013.01)

(58) Field of Classification Search
CPC ... A23L 2/56; B67C 3/026; B67C 7/00; C02F 9/00; C02F 1/001; C02F 1/04; C02F 1/325; C02F 1/441; C02F 1/66; C02F 1/685; C02F 2301/046; A23V 2002/00
See application file for complete search history.

(56) References Cited

U.S. PATENT DOCUMENTS

| | | | | |
|---|---|---|---|---|
| 4,528,093 | A | * | 7/1985 | Winer ............... G07F 13/06 210/257.2 |
| 5,178,734 | A | * | 1/1993 | Palmer ............. B01D 5/0006 203/1 |
| 5,234,563 | A | * | 8/1993 | Arai ................. C02F 1/4618 204/263 |
| 5,443,739 | A | * | 8/1995 | Vogel ............... G07F 15/00 210/257.2 |

(Continued)

*Primary Examiner* — Jonathan Miller
(74) *Attorney, Agent, or Firm* — Eversheds Sutherland (US) LLP

(57) ABSTRACT

The bottling system herein provides for dispensing water with added ingredients into a container. The bottling system includes a distillation station for distilling a flow of the water, an ionization station for raising the pH of the flow of water, one or more ingredient injection stations to add the ingredients into the flow of water, and a filling station for filling the container with the flow of water with the added ingredients.

19 Claims, 1 Drawing Sheet

Landscape A4

(56) References Cited

U.S. PATENT DOCUMENTS

| | | | |
|---|---|---|---|
| 5,611,937 A * | 3/1997 | Jarocki | C02F 1/76 210/764 |
| 5,932,073 A * | 8/1999 | Land | B01D 3/42 203/1 |
| 6,312,589 B1 * | 11/2001 | Jarocki | C02F 9/005 210/266 |
| 6,830,661 B1 * | 12/2004 | Land | F28D 1/0472 202/83 |
| 7,886,557 B2 * | 2/2011 | Anderson | B01D 5/009 62/272 |
| 8,250,972 B2 * | 8/2012 | Santoiemmo | B67D 1/0888 426/477 |
| 8,359,877 B2 * | 1/2013 | Kamen | B67D 1/0888 62/291 |
| 8,479,784 B2 * | 7/2013 | Goldman | B67D 1/0044 141/144 |
| 8,511,105 B2 * | 8/2013 | Kamen | B01D 1/28 62/291 |
| 8,790,513 B1 * | 7/2014 | Boulter | C02F 9/00 210/104 |
| 8,888,963 B2 * | 11/2014 | Kamen | C02F 1/325 202/202 |
| 9,085,449 B2 * | 7/2015 | Goldman | B65B 55/12 |
| 9,309,104 B2 * | 4/2016 | Kamen | B01D 1/28 |
| 9,937,435 B2 * | 4/2018 | Kamen | B01D 1/02 |
| 10,688,451 B1 * | 6/2020 | Santoiemmo | A23L 2/54 |
| 10,744,421 B2 * | 8/2020 | Kamen | B01D 1/2887 |
| 11,285,399 B2 * | 3/2022 | Kamen | B01D 1/2887 |
| 2004/0003990 A1 * | 1/2004 | Mansur | C02F 1/042 203/1 |
| 2005/0211632 A1 * | 9/2005 | Hung | B01D 61/08 210/639 |
| 2009/0242485 A1 * | 10/2009 | Cabados | C02F 9/005 210/652 |
| 2010/0096406 A1 * | 4/2010 | Williams | C02F 1/50 210/615 |
| 2010/0266742 A1 * | 10/2010 | Ferreira | B67D 1/0888 426/477 |
| 2012/0148707 A1 * | 6/2012 | Lackey | C02F 1/003 99/290 |
| 2014/0239521 A1 * | 8/2014 | Ergican | B01F 23/236 261/DIG. 1 |
| 2016/0235801 A1 * | 8/2016 | Thomas | A61K 36/23 |
| 2018/0134540 A1 * | 5/2018 | Garcia | C02F 1/4618 |
| 2021/0400999 A1 * | 12/2021 | Karava | A23L 2/52 |

* cited by examiner

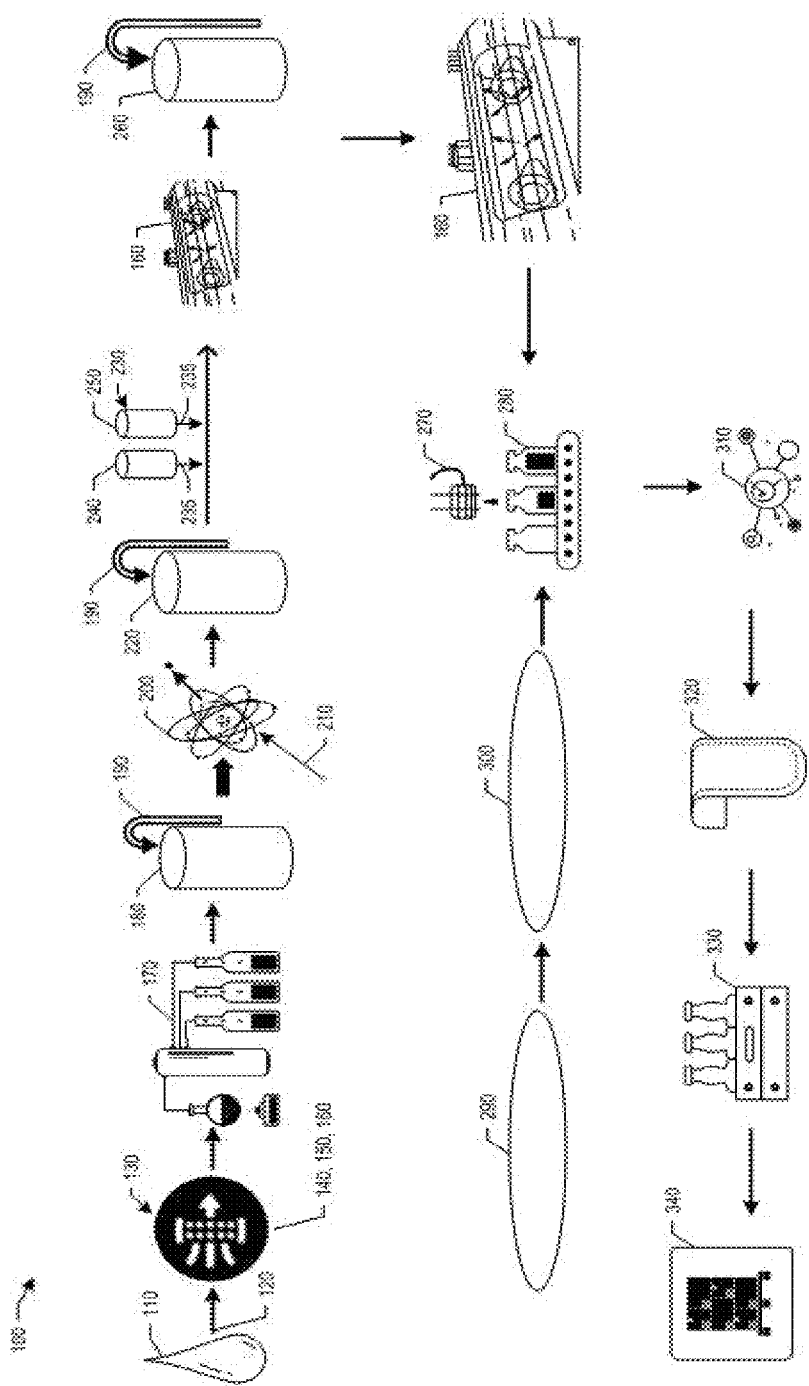

SYSTEMS AND METHODS FOR BOTTLING STILL FLAVORED WATER

TECHNICAL FIELD

The present application and the resultant patent relate generally to systems and methods of bottling beverages and more particularly relate to systems and methods of bottling still water enhanced with various flavors and other ingredients in a shelf stable manner.

BACKGROUND OF THE INVENTION

Various types of bottling methods are in use today to bottle beverages. These methods include cold fill, hot fill, retort, and aseptic. Cold fill techniques generally require the use of different types of preservatives. In a hot fill technique, a container is filled with hot product that in turn sterilizes the container and the closure. The hot fill process generally requires the container to withstand exposure to hot temperatures as well as being able to withstand a vacuum that is induced inside the container. Retort filling is similar but the container is heated after sealing. An aseptic technique fills and caps each container in a sterile environment. Aseptic filling processes do not require the container to withstand exposure to hot temperatures or a vacuum. As a result, the containers may be thinner and/or lighter as compared to those used with hot fill methods because of the lack of thermal expansion and contraction. Aseptic processes, however, generally require a significant capital investment and high operating costs due to the technology involved and the lengthy sterilization processes. Hot fill methods may be preferred in some regions of the world while aseptic filling methods may be preferred in others.

Although each of these techniques efficiently fills containers with different types of beverages in shelf stable manner, each technique also has certain drawbacks in terms of bottle geometry requirements and/or costs. There is thus a desire for improved bottling systems and methods that may fill any type of container with a beverage such as still waters and the like in a safe, economic, and efficient fashion.

SUMMARY OF THE INVENTION

The present application and the resultant patent thus provide a bottling system for dispensing water with added ingredients into a container. The bottling system includes a distillation station for distilling a flow of the water, an ionization station for raising the pH of the flow of water, one or more ingredient injection stations to add the ingredients into the flow of water, and a filling station for filling the container with the flow of water with the added ingredients.

The present application and the resultant patent further provide a method of method of bottling a flow of water with added ingredients into a container. The method may include the steps of distilling the flow of water, raising the pH of the flow of water above about 6.0, adding the ingredients into the flow of water, and filling the container with flow of water with the added ingredients.

These and other features and improvements of the present application and the resultant patent will become apparent to one of ordinary skill in the art upon review of the following detailed description when taken in conjunction with the shown drawings and the appended claims.

BRIEF DESCRIPTION OF THE DRAWING

FIG. 1 is a process flow diagram of a still water bottling system as may be described herein.

DETAILED DESCRIPTION

Referring now to the drawing, in which like numerals refer to like elements throughout, FIG. 1 shows a process flow diagram for a still water bottling system 100 as is described herein. Still (non-carbonated) waters enhanced with various ingredients such as flavorings, botanical extracts, vitamins, and the like are increasingly popular. As described above, cold fill, hot fill, retort, and aseptic bottling methods are all currently in use. The still water bottling system 100, however, provides an alternative to each of these known methods and the drawbacks therein.

The still water bottling system 100 may include a water source 110 for providing a water flow 120. The water source 100 may be a natural water source, a conventional municipal water source, or any convenient source. The still water bottling system 100 may include a pretreatment station 130 for removing impurities in the water flow 120. The pretreatment station 130 may treat the incoming water flow 120 with one or more nano-filters 140, a reverse osmosis system 150, and/or an ultraviolet light source 160. The nano-filters 140 may remove dissolved solids and larger particles in the water flow 120. The reverse osmosis system 150 uses a partially permeable membrane to remove ions, unwanted molecules, as well as larger particles from the water flow 120. The ultraviolet light source 160 may be effective in eliminating microorganisms in the water flow 120. The nano-filters 140, the reverse osmosis system 150, the ultraviolet light source 160, and the other components of the pretreatment station 130 may be of conventional design. Other types of water purification systems and techniques may be used herein.

The still water bottling system 100 may include a vapor distillation system 170. The vapor distillation system 170 may process the water flow 120 in to a very pure distilled form (albeit with low pH). The vapor distillation system 170 may be of conventional design. Other types of distillation and purification systems and techniques may be used herein. The purified water flow 120 may be stored in a first storage tank 180 as needed. The first storage tank 180 may have any suitable size, shape, or configuration. The first storage tank 180 may have a recirculation system 190 for recirculating the purified water flow 120 therein. The recirculation system 190 may use a UV light source 160 therein to maintain the purity of the water flow 120 as needed. Other components and other configurations may be used herein.

The still water bottling system 100 may include an ionization system 200. The ionization system 200 uses electrolysis to separate the water flow 120 into alkaline and acid components so as to raise the pH of the water flow 120. The acid components in the flow may be discarded or put to other uses. The ionization system 200 may be of conventional design. The ionization system 200 may include a salt supply 210 to raise further the pH of the water flow 120. The salt supply 210 may use salts such as potassium carbonate or bicarbonate and the like. For example, other salts may include sodium carbonate or bicarbonate, calcium carbonate or bicarbonate, sodium/potassium/calcium chloride, or sodium/potassium/calcium hydroxide, and the like. Other types of salts may be used herein. The target pH may be greater than about 6.0 and less than about 12.0 with about 9.5 to 11.0 preferred. Different types of beverages may have a different target pH. The now high pH water flow 120 may be stored in a high pH storage tank 220. The high pH storage tank 220 may have any suitable size, shape, or configuration. The high pH storage tank 220 also may use the recirculation system 190 and the UV light source 160 as needed. Other components and other configurations may be used herein.

The still water bottling system 100 may include one or more ingredient injection stations 230. The injections stations 230 may inject highly concentrated doses of any number of ingredients 235 into the water flow 120 at specific flow rates. The ingredient injection stations 230 in this example may include a flavor injection station 240 and a mineral injection station 250. The flavor injection station may inject ingredients 235 such as natural flavors, botanicals, and the like along with chlorides such as calcium chloride and magnesium chlorides, and water. Chlorides may be added to provide a crisp, pure taste to the water flow 120. The dosing rate may be between about 0.01% to about 1.0% by weight with about 0.04% to about 0.30% preferred. Other dosing rates may be used. The mineral injection station 250 may inject ingredients 235 such as minerals such as bicarbonates and more specifically such as potassium bicarbonate and like as well as water. The dosing rate may be between about 0.01% to about 1.0% by weight with about 0.04% to about 0.30% preferred. Other dosing rates may be used. The injections stations 230 may use any type of positive displacement pump and the like to provide accurate doses of the ingredients 235 to the water flow 120. Other types of dosing mechanisms may be used herein. Any number of the ingredient injection stations 230 may be used herein with any number of different ingredients 235. Other components and other configurations may be used herein.

Specifically, examples of the ingredients 235 that may be used herein include natural flavors, natural flavor extracts, artificial flavors, botanical extracts (such as hibiscus tea, lavender, dandelion, ashwagandha, ginseng, rhubarb, holy basil, and the like), vitamins (such as A, E, B3, B5, B6, B12, C, and the like), and antioxidants (such as selenium, zinc, and the like). Other ingredients, such as collagen, fiber, activated charcoal, ginger, and the like also may be used herein. The overall still water bottling system 100 is not limited by the nature of the ingredients 235 used herein. Examples of current flavors include strawberry blackberry, pineapple kiwi, watermelon mint, cucumber lime, lemon ginger, passion fruit mango, blueberry grapefruit, and orange lemongrass. Example of other types of enhanced beverages include lemon rose with collagen, dandelion with lemon, and ginseng and green tea. Any flavor and flavor combinations may be used herein. The possible combinations provided by the still water bottling system 100 are limitless.

The now injected water flow 120 may again flow through an ultraviolet light source 160. The intensity here may range from about 40 mJ/cm$^2$ to about 200 mJ/cm$^2$ with about 75 mJ/cm$^2$ preferred. Other intensities may be used herein. The other uses of the ultraviolet light source 160 may be similar in intensity and may be in the range of about 120 mJ/cm$^2$ to about 200 mJ/cm$^2$ or so. The water flow 120 may be stored in a beverage storage tank 260. The beverage storage tank 260 may have any suitable size, shape, or configuration. The beverage storage tank 260 also may use the recirculation system 190 and the UV light source 160 as needed. Other components and other configurations may be used herein.

The still water bottling system 100 may include a filler and closure station 270. A further ultraviolet light source 160 may be used between the beverage storage tank 260 and the filler and closure station 270 as needed. The filler and closure station 270 may be of conventional design. The filler and closure station 270 fills a container 280 such as a bottle, a can, a pouch, and the like with a predetermined volume of the flow of water 120 and caps or otherwise seals the container 280. The container 280 may have any suitable size, shape, or configuration. Any type of container 280 may be used herein. The container 280 may be made out of any type of suitable materials such as glass, plastics, metals, laminates, and the like.

Upstream of the filler and closure station 270, the still water bottling system 100 may either create the containers 280 via, for example, in-line blow molding and the like or existing containers 280 may be placed into the system 100 via a de-palletizer 290 or similar types of devices. The de-palletizer 290 may be of conventional design. The containers 280 then may pass through a wash section 300. The wash section 300 may sanitize the containers 280 by, for example, rinsing them with water containing ozone (about 0.1 to about 0.5 ppm with about 0.2 to about 0.4 ppm preferred) or ionized air. Para-acetic acid and the like also may be used. Other types of sanitizing methods may be used herein. The now sanitized containers 280 then may be forwarded to the filler and closure station 270. Other components and other configurations may be used herein.

Downstream of the filler and closure station 270, the still water bottling system 100 may include a quality control station 310. The quality control station 310 may perform any number of quality checks as needed. For example, closure integrity, taste, odor, appearance, and the like may be examined. The quality control station 310, and the components thereof, may be of conventional design. The container 280 then may pass through a labeler 320, a case packer 330, a palletizer 340, and other types of conventional packing stations. The container 280 may now be distributed to the consumer. The container 280 may be shelf stable at ambient temperatures for at least nine months. The still water bottling system 100 and the components thereof described herein are for the purpose of example only. Many other components may be used herein in any configuration.

In use, the water flow 120 from the water source 110 may be treated at the pre-treatment station 130 and distilled at the vapor distillation station 170. The pH of the distilled water flow 120 may be raised in the ionization system 200 using salts from the salt supply 210. Ingredients 235 such as flavors and/or minerals then may be added to the high pH water flow 120 by the flavor injection station 240 and/or the mineral injection station 250 of the ingredient injection station 230. Other types of ingredients also may be added at this point. The flavored water flow 120 may be treated again and bottled in a container 280 in the filler and closure station 270 or otherwise packaged and distributed.

Testing has established that the sensory and taste profile for flavored still waters is enhanced by a relatively high pH of over about 4.6. Specifically, beverages with a pH of less than about 4.6 may come across as acidic and unauthentic while beverages with a pH of greater than about 4.6 provide an authentic taste of the added ingredients. The still water bottling system 100 described herein thus provides a method of bottling enhanced still waters that is distinct from cold fill, hot fill, retort, aseptic fill, or other types of known bottling methods. Moreover, traditional hot fill or aseptic fill techniques cannot provide such an authentic taste profile because the heat used therein has an impact on taste. Rather, the still water bottling system 100 herein uses the water flow 120 with high pH but without heat to provide a shelf stable beverage in an efficient manner.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A bottling system for dispensing water with added ingredients into a container, comprising:
    a vapor distillation station for distilling a flow of the water;
    an ionization station for raising the pH of the flow of water;
    wherein the ionization station separates the flow of water into alkaline components and acid components;
    one or more ingredient injection stations to add the ingredients into the flow of water; and
    a filling station for filling the container with the flow of water with the added ingredients.

2. The bottling system of claim 1, further comprising a pre-treatment station for removing impurities from the flow of water.

3. The bottling system of claim 2, wherein the pre-treatment station comprises one or more of a filter, a reverse osmosis system, and an ultraviolet source.

4. The bottling system of claim 1, further comprising one or more ultraviolet light sources.

5. The bottling system of claim 1, further comprising one or more storage tanks.

6. The bottling system of claim 5, wherein the one or more storage tanks comprise a recirculation system.

7. The bottling system of claim 1, wherein the ionization station comprises a salt supply.

8. The bottling system of claim 7, wherein the salt supply comprises a potassium, a sodium, or a calcium.

9. The bottling system of claim 1, wherein the ionization station raises the pH of the water flow to between about 6.0 and 12.0.

10. The bottling system of claim 1, wherein the ionization station raises the pH of the water flow to between about 9.5 to 11.0.

11. The bottling system of claim 1, wherein the one or more ingredient injection stations comprise one or more of a flavor injection station and a mineral injection station.

12. The bottling system of claim 1, wherein the ingredients in the one or more ingredient injection stations comprise one or more of minerals, natural flavors, natural flavor extracts, artificial flavors, botanical extracts, vitamins, and antioxidants.

13. The bottling system of claim 1, wherein the one or more ingredient injection stations dose the ingredients at a dosing rate of about 0.01% to about 1.0% by weight.

14. The bottling system of claim 1, further comprising an ozone water wash station for the container.

15. A method of bottling a flow of water with added ingredients into a container, comprising:
    distilling the flow of water;
    separating the flow of water into alkaline components and acid components;
    raising the pH of the flow of water above about 6.0 before adding the ingredients therein;
    adding the ingredients into the flow of water; and
    filling the container with flow of water with the added ingredients.

16. The bottling system of claim 1, wherein the one or more ingredient injection stations are downstream of the ionization station.

17. The bottling system of claim 16, wherein the ionization station raises the pH of the flow of water before the ingredients are added.

18. The bottling system of claim 1, wherein the ionization station discards the acid components.

19. The method of claim 18, wherein the distilling step comprises vapor distilling.

* * * * *